United States Patent [19]

Levine

[11] Patent Number: 4,481,945
[45] Date of Patent: Nov. 13, 1984

[54] DEPLOYMENT SYSTEM FOR EMERGENCY OXYGEN MASK

[75] Inventor: Harold H. Levine, Northridge, Calif.
[73] Assignee: Lockheed Corporation, Burbank, Calif.
[21] Appl. No.: 465,405
[22] Filed: Feb. 10, 1983
[51] Int. Cl.³ .......................... A62B 7/00; A62B 7/14
[52] U.S. Cl. .......................... 128/206.27; 128/202.13; 128/205.25; 244/118.5; 221/87
[58] Field of Search .................... 128/202.13, 205.25, 128/204.18, 205.24, 206.27; 244/118.5, 147, 148, 149; 221/87, 89; 224/311; 280/727

[56] References Cited

U.S. PATENT DOCUMENTS

| | | | |
|---|---|---|---|
| 1,144,559 | 6/1915 | Mendelson et al. | 221/87 |
| 3,073,301 | 7/1958 | Hay et al. | 128/142 |
| 3,503,394 | 7/1968 | Hotz et al. | 128/146.4 |
| 3,981,302 | 9/1976 | Veit | 128/203 |
| 4,023,874 | 5/1977 | Jong et al. | 321/291 |

OTHER PUBLICATIONS

National Transportation Safety Board, Report Number NTSB-AAS-76-1, (Special Study—Chemically Generated Supplemental Oxygen Systems in DC-10 and L-1011 Aircraft).
Pp. 22 and 23 of "Engineering Description Series: INTERIORS, GALLEY and CARGO," published by Lockheed-California Company at Burbank, CA in Mar. of 1974.

Primary Examiner—Henry J. Recla
Attorney, Agent, or Firm—Louis L. Dachs

[57] ABSTRACT

Upon the occurrence of a cabin depressurization emergency, a manually operated deployment handle is presented to the passengers in the vicinity of each of the aircraft's supplemental oxygen deployment compartments. A simple manual manipulation of the handle results in the extraction of the individual oxygen masks from the compartment and the activation of the oxygen generating system. In one preferred embodiment, the masks and related oxygen equipment are stowed in an overhead compartment and the manually operated handle is a deployment ring (22) attached by means of a lanyard (24), both to a mask extraction sheath (26) and to an actuator pin (32) associated with the oxygen supply subsystem (20). When the door (10) to the overhead compartment is opened automatically in response to a depressurization signal, the ring falls towards the passenger. When the ring is pulled, the oxygen flow is initiated and at the same time the masks are positively extracted from their stowed position. In an alternative embodiment, the supplemental oxygen compartment is normally concealed by an electrically operated door (110) in the immediate vicinity of the seated passenger. When the door is opened by means of the appropriate electrical signal, one or more oxygen masks (126) are revealed inside the compartment, protected by a transparent barrier (118) to which is attached a handle (120) and a lanyard (122). When the handle is pulled, oxygen commences to flow to the masks in the compartment and at the same time the barrier is removed so that the passenger now has access to the individual masks.

3 Claims, 8 Drawing Figures

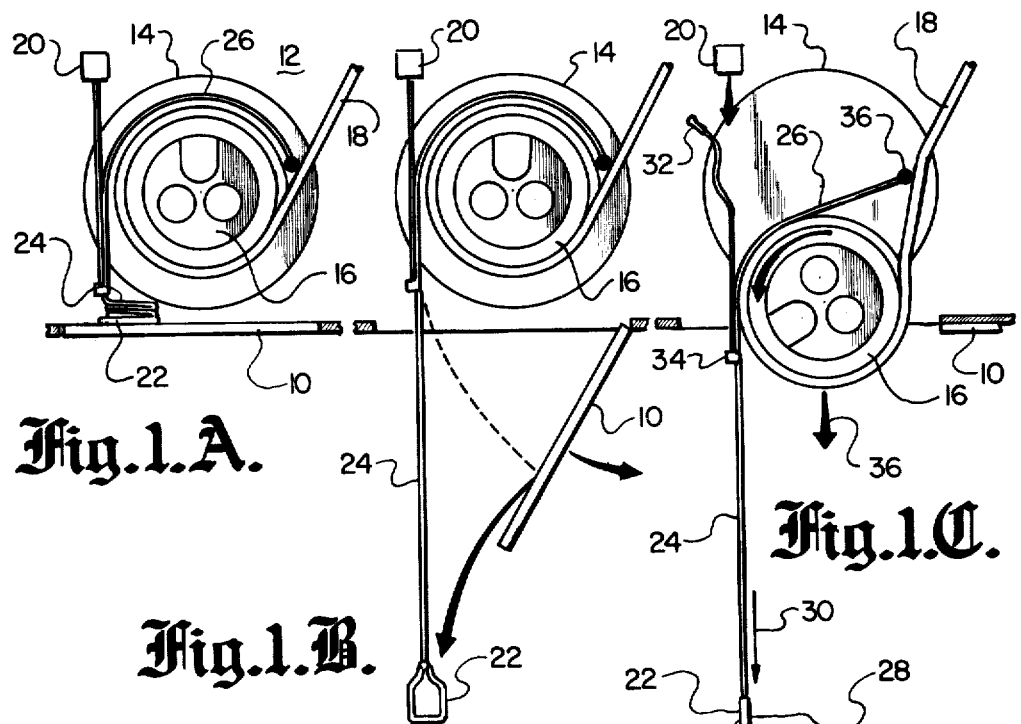
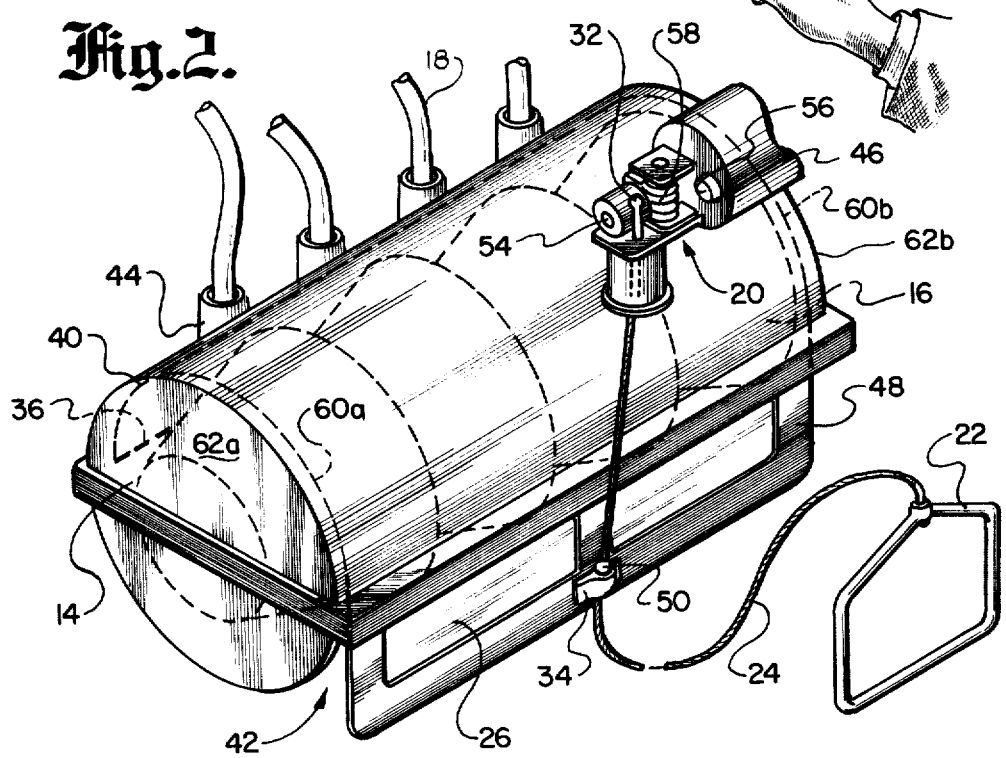

DEPLOYMENT SYSTEM FOR EMERGENCY OXYGEN MASK

TECHNICAL FIELD

The present invention relates generally to oxygen generation systems for use aboard aircraft and, more particularly, to apparatus for deploying oxygen masks for use by passengers under emergency conditions.

BACKGROUND ART

According to statistics published by the National Transportation Safety Board, as many as 10 severe decompressions occur each year with U.S. air carrier operations and 1,500 to 2,000 passengers may be exposed to the dangers of decompression. Supplemental oxygen systems are provided to minimize these dangers. In Safety Recommendations dated Apr. 29, 1976, the National Transportation Safety Board discussed various alleged problems with chemically generated passenger supplemental oxygen systems. Among their Class III. (Longer-Term Follow Up) recommendations was "Develop standards for the use of accepted human factors, engineering principles and system design concepts in the design of passenger supplemental oxygen systems." That report, in discussing one specific prior art supplemental oxygen system, observed: "The system requires excessive passenger involvement and responses. The passenger must remove the oxygen mask from stowage, activate the system and use it properly." The report also noted that in three decompression incidents involving such a prior art system, passengers failed to pull the mask to their faces (such action was required to activate the system); instead, they leaned forward and attempted to breathe into the mask without fully removing it from the stowed position. In such a prior art system, a pin must be pulled from a spring loaded striker in order to initiate the oxygen generating process within the solid state oxygen generator; the pin is attached to the oxygen mask by a lanyard. Thus, when a sufficient pulling force is applied to the mask by the passenger, this force is transmitted by the lanyard to the pin, thereby causing the pin to be extracted from the striker mechanism. A similar lanyard and pin mechanism is utilized in other types of prior art oxygen systems wherein the oxygen is stored as a pressurized gas within a suitable pressure vessel and the pin is associated with a valve mechanism such that upon the extraction of the pin, a valve in the flow path between the source of the oxygen and the mask is opened.

In another type of prior art supplemental oxygen system, solid state oxygen generators are activated by means of an electric current which ignites a pyrotechnic fuse. In such systems, it is conventional to utilize the same electrical signal to activate the generation of the oxygen and to cause the oxygen masks attached to the oxygen generator to be presented to the passengers for use. Thus, no specific action is required by the passenger to initiate the flow of oxygen or otherwise to cause the deployment of the system. All that the passenger need do is place the mask through which the oxygen is already flowing into position against his nose and mouth. However, such electrically activated systems are expensive both in terms of cost and weight; furthermore, since all of the supplemental oxygen masks within the airplane are deployed and all of the associated oxygen generators are fired in response to a single electrical signal originating from a single sensing device (or from a single control switch aboard the flight deck), it is not practical for the deployment capabilities of the system to be tested during routine maintenance operations without the generators themselves being fired. Furthermore, in the event that the control switch is accidentally depressed, all the masks will be deployed and all the oxygen generators will be fired, requiring that each individual solid state oxygen generator be replaced and each individual mask be re-sanitized and carefully replaced in its stowed position inside its individual emergency compartment.

Thus, it will be appreciated that there is a need for an improved deployment system for emergency supplemental oxygen which during actual emergency conditions the individual passenger will find convenient and easy to use without elaborate instructions or assistance from the cabin crew and in which the proper operation and functioning of the electro-mechanical components can be conveniently tested without affecting the proper functioning of the individual components during a subsequent emergency and without requiring any subsequent labor intensive and costly sanitizing, repackaging and/or replacing of the masks or generators.

DISCLOSURE OF THE INVENTION

Upon the occurrence of a cabin depressurization emergency, a manually operated deployment handle is presented to the passengers in the vicinity of each of the aircraft's supplemental oxygen deployment compartments. A simple manual manipulation of the handle results in the extraction of the individual oxygen masks from the compartment and the activation of the oxygen generating system. In this manner, the passenger is assured of convenient access to supplemental oxygen in the event of a depressurization emergency, while also insuring that the mask, when presented to the passenger, will always be ready for use with the oxygen already flowing and also that the automatic electro-mechanical components may be thoroughly tested without thereafter requiring that the masks be individually sanitized and repackaged in their stowed arrangement or requiring the replacement of any oxygen generators inadvertently fired during the test.

In one preferred embodiment, the masks and related oxygen equipment are stowed in an overhead compartment and the manually operated handle is a deployment ring attached by means of a lanyard, both to a mask extraction sheath and to an actuator pin associated with the oxygen supply subsystem. When the door to the overhead compartment is opened automatically in response to a depressurization signal, the ring falls towards the passenger. When the ring is pulled, the oxygen flow is initiated and at the same time the masks are positively extracted from their stowed position.

In an alternative embodiment, the supplemental oxygen compartment is normally concealed by an electrically operated door in the immediate vicinity of the seated passenger. When the door is opened by means of the appropriate electrical signal, one or more oxygen masks are revealed inside the compartment, protected by a transparent barrier to which is attached a handle and a lanyard. When the handle is pulled, oxygen commences to flow to the masks in the compartment and at the same time the barrier is removed so that the passenger now has access to the individual masks.

BRIEF DESCRIPTION OF THE DRAWINGS

For a better understanding of the present invention as exemplified by certain presently preferred embodiments thereof, reference is made to the following detailed description of the best mode for practicing the invention and the appended drawings in which:

FIG. 1 comprising FIG. 1A, 1B and 1C is a series of views showing a first embodiment of the present invention in operation, with FIG. 1A showing the system in its stowed condition; FIG. 1B showing the system with the operating handle presented to the passenger but the mask not yet deployed and FIG. 1C showing the mask being deployed and the flow of oxygen initiated in response to the passenger's downward pull on the handle.

FIG. 2 is an isometric view, partially cut away, of an oxygen generator and mask subsystem constructed in accordance with the present invention and incorporating the relevant features of the FIG. 1 embodiment;

Figure 3:
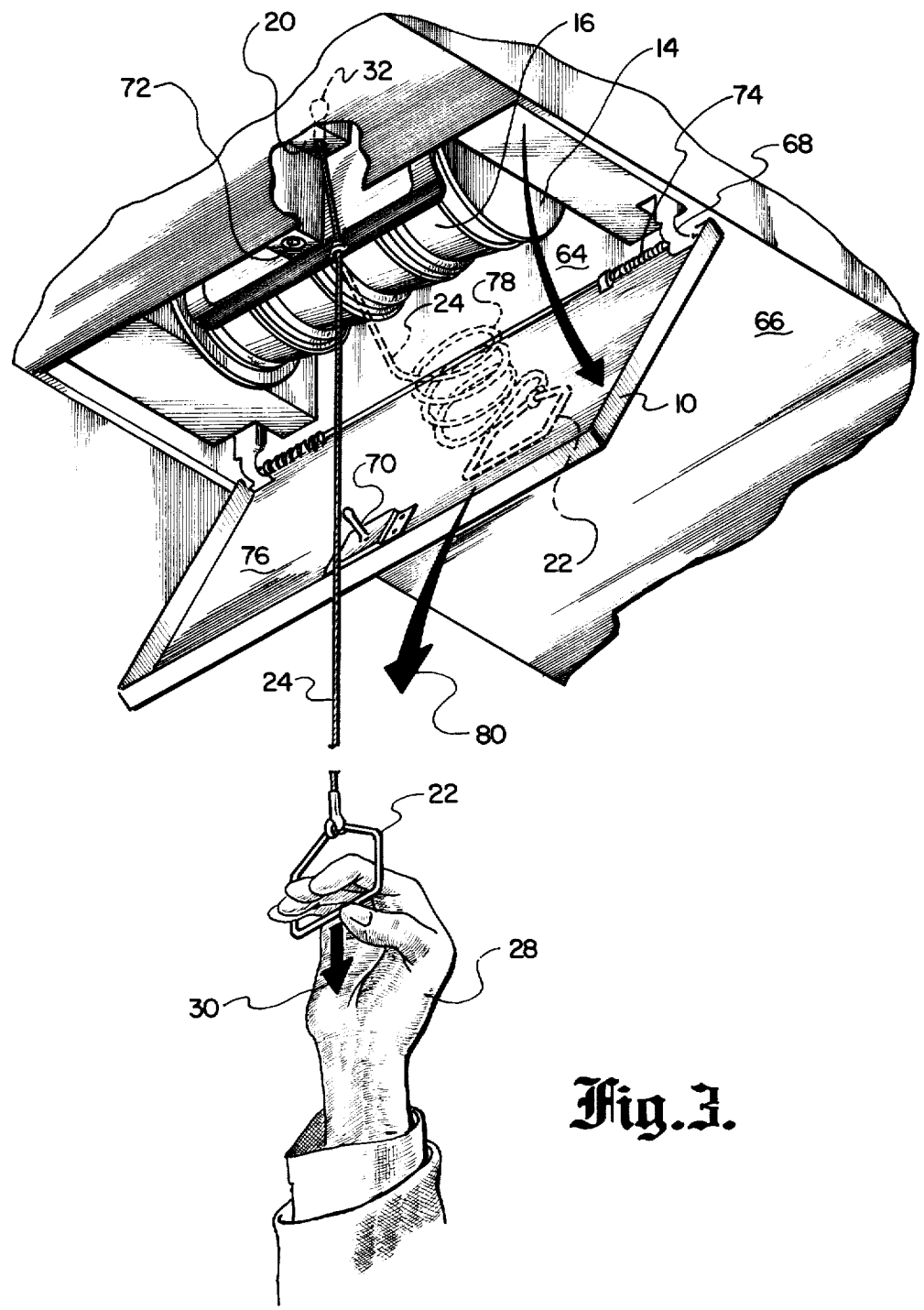
FIG. 3 is an isometric view, partially cut away, showing the subsystem of FIG. 2 in place within its corresponding compartment after the compartment door has opened and the operating handle has been presented to the passenger who is about to pull same.

Best Mode for Carrying Out the Invention

Referring now to FIG. 1 which, as mentioned previously, comprises three subfigures, namely, FIG. 1A, 1B and 1C, the basic operation of a first presently preferred embodiment may be readily understood. An electrically actuated door 10 is provided beneath an overhead oxygen compartment 12 containing a modular mask holder 14 which is designed to hold a plurality of individual oxygen masks 16, each connected by means of individual hose 18 to an oxygen source (not shown) as well as an appropriate device 20 for initiating the flow of oxygen from its source to the individual masks 16 via their respective hoses 18. Also contained within the compartment 12 is an operating handle 22 provided with a flexible lanyard 24. One end of the lanyard 24 is attached to the handle 22, an intermediate point is attached to a deployment sheath 26, the purpose of which will become more clear hereinafter, and the lanyard's other end terminates at the aforementioned initiation device 20.

Referring now particularly to FIG. 1B which shows the components of FIG. 1A in the condition they would assume as the compartment door 10 is opened in response to an external electrical signal (generated either by an automatic depressurization detector or by the manual actuation of a suitable switch by the aircraft operating personnel), it will be seen that the handle 22 has now dropped as a result of gravity to its deployed position and the lanyard 24 has unfolded to its normal length. However, friction retains the masks 16 in their stowed position within the mask holder 14. Accordingly, the electrical signal which initiates the automatic deployment of the supplemental oxygen system has no physical effect on the individual masks 16 and coiled hoses 18 within the mask holder 14, but only results in the opening of the compartment door 10 and the dropping of the handle 22 and the attached lanyard 24 to a position where the handle 22 is presented to the passenger. Preferably the handle 22 is painted red and provided with a "Pull" legend or downwardly facing arrows or other suitable indicia, so that the passenger will know that he should pull it to release the oxygen masks 16 which are now visable overhead but still stowed inside the compartment. It will be appreciated that not only does this result in the presentation and deployment of the oxygen system to the passenger in a manner that is calculated to minimize delay and confusion as to its manner of operation and use but additionally it is possible, at regularly scheduled service intervals, to test the proper automatic operation of the emergency oxygen compartment doors 10 not only for electrical continuity but also for proper mechanical adjustment of the electrically operated latch and also to detect any possible mechanical interference or jamming of the door mechanism which could result in the door failing to open during a subsequent emergency even if the electrical mechanism were functioning properly.

Now referring to FIG. 1C, it will be seen that the hand 28 of the passenger has exerted a downward force 30 on the handle 22, this force being exerted via the flexible lanyard 24 to cause the other end thereof 32 to be extracted from the oxygen initiation device 20 and thereby resulting in the flow of oxygen into the oxygen hose 18 and the masks 16. At the same time, the downward force 30 on the lanyard 24 is transmitted to the exposed left hand edge of the sheath 26 by means of the lanyard attachment 34. This in turn results in the tensioning of the sheath 26 between its exposed left hand edge and its right hand edge which is attached to the mask holder 14 at a sheath-to-holder interface attachment 36. This tension force will tend to straighten out the sheath 26 between the lanyard attachment 34 and the sheath-to-holder attachment 36 and thereby displace the individual masks 16 downwardly from their normal stowed position until they are free of any friction or other interference from the mask holder 14 and will fall downwards toward the passenger by the virtue of the force of gravity 36.

Figure 4:
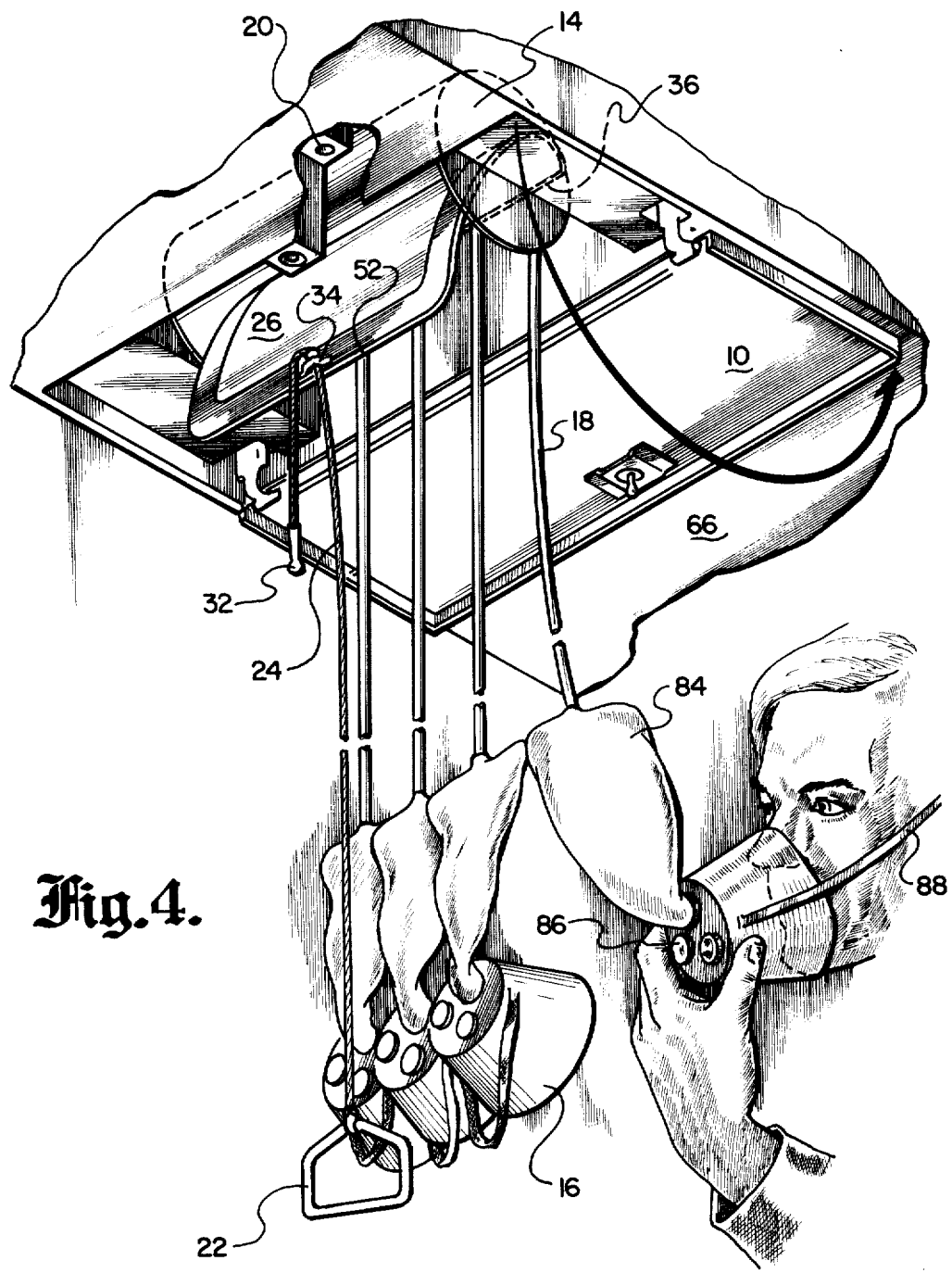
FIG. 4 shows the various subsystems of FIGS. 2 and 3 in their fully deployed state

Reference should now be made to FIG. 2 which is an isometric view of a mask deployment system generally similar to that shown in FIG. 1. Accordingly, many of its individual elements will be designated by the same reference numbers which were used for the corresponding elements previously described with respect to FIGS. 1A, 1B and 1C. From FIG. 2 it may be seen that the mask holder 14 is generally in the shape of a portion of a cylinder having an enclosed semi-cylindrical top portion 40 and an open bottom portion 42. Contained within the interior of the mask holder 14 (as indicated in the Figure in dashed outline) are a total of four individual oxygen masks 16, each in the form of a truncated cone and arranged along the horizontal axis of the mask holder 14 in nested fashion. Located above the four masks 16, between the masks and an interior upper surface defined by the semi-cylindrical holder portion 40, there is contained the sheath element 26 which (as best seen in FIGS. 2 and 4) is generally rectangular in shape, but which in its normal stowed position (as shown in FIG. 2), assumes in cross-section an inverted J-shape, with the curved portion of the "J" being oriented circumferentially about the longitudinal axis of the cylinder defined by the upper portion 40 of the mask holder 14 and the nested assembly of masks 16.

The inner edge 36 of the sheath, i.e., the edge of the sheet corresponding to the tip of the shorter leg of the "J", is flexibly attached to an interior surface of the mask holder 14 by the attachment provision 36 in the vicinity of the hose passageways 44 through which the oxygen hoses 18 pass as they lead from the masks 16 contained therein to the exterior oxygen generator 46. The opposite edge of the sheath 26, that is to say the edge directly across from the attached edge 36, is provided with a reinforcing rib 48 to which is attached an intermediate portion of the lanyard 24 by means of a suitable attaching reinforcement 34. A bead or knot or other similar stop 50 is provided on lanyard 24 above the lanyard-to-sheath attachment 34 so that when a tensile force is exerted by means of the handle 22, the force is transmitted to the protruding lower edge 52 of the sheath 26 and at the same time the lanyard's end 32 will be extracted from the oxygen initiation mechanism 20.

As illustrated, this mechanism so comprises a striker 54 which will be urged against a percussive element 56 by a coil spring 58 once the lanyard pin 32 has been pulled to a position away such that it will no longer interfere with the movement of the striker 54 towards the cap 56. However, it should be understood that other initiation mechanisms could also be utilized such that they would be actuated by a tensile force via a lanyard. For example, the mechanism could be a flow valve leading to a source of gaseous oxygen or an electrical switch connected to an electrical circuit that supplies power to an electrical ignitor within a solid state oxygen candle.

It will be seen that some clearance is provided between the two side edges 60A, 60B of the sheath 26 and the corresponding ends 62A, 62B of the mask holder 14. Thus, when a downward force is applied to the sheath's lower outer edge 52 and the upper inner edge 36 remains attached to the mask holder 14, tension will be applied across the sheath 26 so as to tend to straighten out the curved portion of the "J" defined thereby and which will at the same time cause the inner surface of the sheath to press downwardly against the outer upper surfaces of the nested masks 16.

Reference should now be made to FIG. 3 which it will be recalled is an isometric partially cut away view of a first embodiment of the present invention at the moment the compartment door 10 has commenced to open and the passenger is about to pull down on the handle 22 thereby extracting the masks 16 from the mask holder 14 and at the same time initiating the flow of oxygen to the masks. Referring specifically to FIG. 3, it will be seen that in a typical application, the door 10 to the overhead emergency oxygen compartment 64 is located in a false ceiling 66 and is secured thereto by means of a pair of hinges 68 at one edge. At the other edge of the door 10, there is provided a catch 70 that interacts with an electromagnetic actuated latch mechanism 72 mounted to the ceiling 66 whereby in response to an appropriate electrical impulse the catch 70 is released and the door 10 starts to swing down due to the action of gravity (and possibly assisted by a pair of springs 74). Normally, the door 10 is closed in a horizontal position and the deployment handle 22 rests against an upper surface 76 of the door 10 and the lanyard 24 is neatly folded or coiled (as indicated in the figure in dashed outline and the reference numeral 78); however, as indicated by the arrow 80, as soon as the door commences to open, the handle 22 is free to drop to its extended position such that it is now conveniently accessible to the passenger who may accordingly reach upwards with his hand 28, grasp the handle 22 and exert a downward pull or tug (indicated symbolically in the figure as a force 30). However, until the moment that the tensile force 82 has actually been applied to the lanyard 24, the upper end of the lanyard 32 will remain in place within the oxygen flow initiation mechanism 20 and the individual mask 16 will remain in place within the mask holder assembly 14. However, because the door 10 is now open, the brightly colored masks 16 will be quite visible to the passenger and it will be a simple, almost unconscious act on his part to release the masks 16 by pulling down on the deployment handle 22.

Reference should now also be made to FIG. 4, which incidentally shows the door 10 fully opened such that it now rests horizontally against the false ceiling 66 and is in a position where it can not interfere with the deployment and use of the mask 16. It will be seen that the oxygen mask deployment system has now assumed the condition that would occur once the handle 22 has been pulled downwards.

In particular, the upper end 32 of the lanyard has now been extracted from the oxygen initiation mechanism 20 thereby resulting in the initiation of the flow of oxygen via the oxygen hoses 18 to the individual oxygen mask 16 which in the embodiment illustrated include a flexible reservoir pouch 84 and valve 86 and an elastic head strap 88. Still referring to FIG. 4, it will also be seen that the sheath 26 remains fixed along its upper edge 36 to the interior of the mask holder subassembly 14. However, its lower edge 52 (to which the lanyard 24 is attached by means of lanyard attachment 34) has been downwardly displaced from the position shown in FIG. 3 and the curved, inverted "J" cross-section of the sheath has been considerably flattened in the process causing the individual masks 16 to be forced downward to the point where they are no longer held within the mask holder 14 but rather are free to drop downwards until supported only by their respective oxygen hoses 18.

The above-described embodiment has been particularly designed for use in an overhead oxygen compartment located above the passenger seat. However, it should be understood that many of the principles and features underlying the present invention are usable for other types of applications, such as the alternative seat-back embodiment shown in FIGS. 5 and 6. Such a location is already utilized aboard aircraft flown by many different air carriers and has certain advantages in terms of cost and covenience of installation. However, as noted previously under the heading "Background Art", it is a location particularly susceptible to improper use by the passengers and even by the airlines' own maintenance personnel. Because of its location directly in front of a passenger, the access door 110 is susceptible to tampering or otherwise being opened during the flight. In prior art seat-back emergency oxygen systems, once the door is opened (for example, as the result of excessive shaking and rattling during an air-turbulence condition), the oxygen masks are presented automatically to the passengers, thereby encouraging further tampering and even the possible inadvertent operation of the oxygen generating candle. Furthermore, prior to the closing of the compartment door to restore normal operation of the system, it is essential that a qualified maintenance person inspect the masks and their hoses to ensure that they are properly stowed and not cut or pinched between the door and the seat-back opening. Finally, as noted previously, such prior art systems require that a lanyard attached to the masks be pulled with a relatively strong force in order to extract a firing pin from the oxygen generator's ignition mechanism; otherwise, no oxygen will flow to the mask. These various shortcomings of the prior art seat-back emergency oxygen systems may be readily overcome by the practice of the present invention as embodied in the particular subsystem as is illustrated in FIGS. 5 and 6, or other similar systems utilizing the various principles and features of the present invention.

Figure 5:
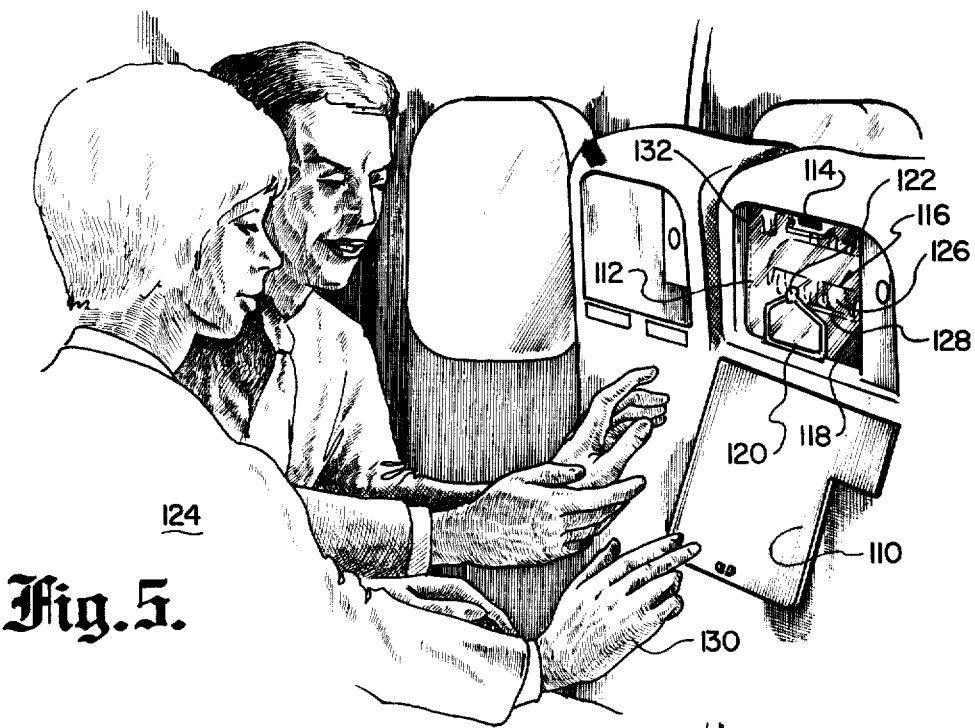
FIGS. 5 and 6 show an alternative embodiment particularly adapted for seat-back installations, with FIG. 5 showing the system presented to the passenger for operation and use and FIG. 6 showing the system after the operating handle has been pulled and the masks are available for use with the oxygen flow already underway.

Referring now particularly to FIG. 5, it will be seen that this Figure shows the condition and arrangement of the various elements of the subsystem at the instant when door 110 to the oxygen compartment 112 has been opened by means of a conventional electrically actuated latch 114. However, the various oxygen generation subsystem components (indicated generally by the reference numeral 116) within the seat-back compartment 112 remain protected by a transparent cover 118. Also exposed to the passenger is a pull handle 120 which could be integrally molded as part of the protective cover 118 or which alternatively could be flexibly coupled thereto by means of a lanyard 122. Thus, after the door 110 has been opened in response to the detection of an emergency condition requiring that the passengers be supplied with supplemental oxygen, the individual passengers 124 see the contents of the oxygen subsystems compartment 112 including the individual oxygen masks 126 behind the transparent cover 118, and also the pull handle 120 which as in the case of the above-described embodiment is preferably colored or otherwise marked to symbolize its emergency function. The lanyard 122 is attached to a sheath 128 analogous in function to sheath 26 of the FIG. 2 embodiment and also to an oxygen initiation mechanism (not visible) analogous to the mechanism 20 described previously.

Figure 6:
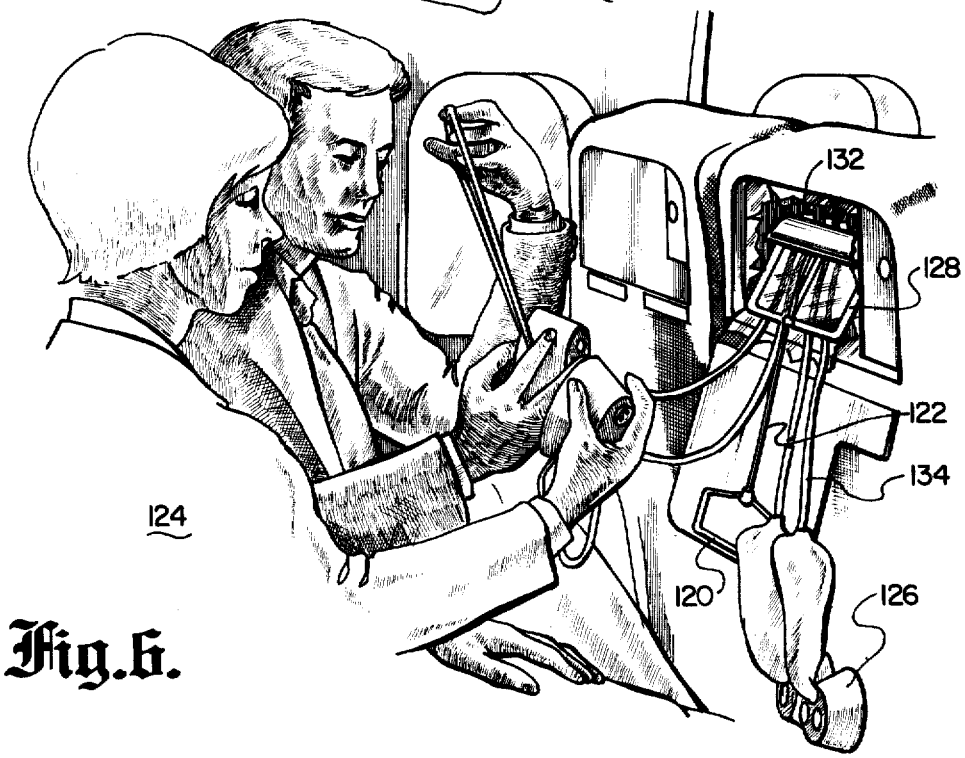

Accordingly (as best seen in FIG. 6), when the passengers 124 reach up with their hands 130 and pull the handle 120, the protective cover 118 is caused to separate from the seat-back opening 132 and at the same time the sheath 128 forcibly extracts the individual oxygen masks 126 complete with their hoses 134 out of the seat-back compartment 112 and towards the laps of the passengers 124. The function of the sheath 128 is essentially as previously described for the sheath 26 and will not here be described in further detail. Suffice it to say that a single, readily apparent manual operation, namely, the pulling of the handle 120, simultaneously results in three functions: (a) providing physical access to the oxygen compartment 112; (b) removing the individual masks 126 to a location where they may be conveniently seized by the passengers, and (c) initiating the flow of oxygen to the masks 126 via the corresponding oxygen hoses 134.

It will thus be apparent that there has been described two embodiments of an Improved Deployment System for Emergency Oxygen Masks, both having the desired advantages of simplicity and convenience of use and avoiding many of the shortcomings of prior art supplemental oxygen systems. While two such embodiments have been described in detail, it should be readily apparent to those skilled in the art that numerous other variations are possible without departing from the spirit and scope of the present invention as defined in the appended claims.

INDUSTRIAL APPLICATION

The present invention will find utility in connection with pressurized passenger transport aircraft and may be installed aboard such aircraft as replacements for conventional supplemental oxygen deployment systems.

I claim:

1. A mask deployment subsystem for use with a supplemental oxygen system aboard an aircraft, said deployment subsystem comprising:
   an oxygen mask;
   means for holding said mask in a stowed position including a frame structure defining an opening with opposite side portions whereby said holding means is adapted to hold said mask within said frame structure inside said opening;
   a flexible sheath having a first edge fixed to said frame structure adjacent one side portion thereof and an opposite second edge movable relative to said first edge, said sheath having an intermediate portion dimensioned such that it may be contained within said mask holding means and positioned such that it is draped about said mask when said mask is inside said frame structure in said stowed position with said opposite second edge terminating adjacent said opposite side portion of said frame structure;
   a handle; and
   means for applying tension between said first and second edges of said sheath in response to a manual pulling force being applied to said handle, whereby when said handle is pulled, said intermediate portion of said sheath will become taut and will thereby exert a force on said mask tending to displace said mask from said stowed position.

2. The deployment subsystem of claim 1, wherein said tension applying means comprises a lanyard extending from said handle to said second edge of said sheath.

3. The deployment subsystem of claim 2 further comprising means for initiating the flow of oxygen to said mask in response to said manual pulling force being applied to said handle;
   whereby said pulling force applied to said handle will cause oxygen to begin to flow to said mask at the same time said mask is being displaced from its said stowed position.

* * * * *